United States Patent
Suzuki et al.

(10) Patent No.: US 6,885,447 B2
(45) Date of Patent: Apr. 26, 2005

(54) SPECTROMETER AND OPTICAL SPECTRUM ANALYZER

(75) Inventors: Yasuyuki Suzuki, Musashino (JP); Yoshihiro Sanpei, Musashino (JP); Makoto Komiyama, Musashino (JP); Kenji Ogino, Musashino (JP); Raiju Okada, Musashino (JP); Shuuhei Okada, Musashino (JP); Shin Kamei, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 10/653,252

(22) Filed: Sep. 3, 2003

(65) Prior Publication Data

US 2004/0075831 A1 Apr. 22, 2004

(30) Foreign Application Priority Data

Oct. 18, 2002 (JP) .......................... 2002-303736
Oct. 29, 2002 (JP) .......................... 2002-313713

(51) Int. Cl.[7] .............................................. G01J 3/28
(52) U.S. Cl. ...................................... 356/328; 356/334
(58) Field of Search ................................ 356/326, 328, 356/334; 359/566

(56) References Cited

U.S. PATENT DOCUMENTS

| | | | | |
|---|---|---|---|---|
| 4,983,039 A | * | 1/1991 | Harada et al. | 356/328 |
| 5,691,847 A | * | 11/1997 | Chen | 359/566 |
| 6,570,652 B1 | * | 5/2003 | Cappiello | 356/328 |
| 6,693,745 B1 | * | 2/2004 | Kondis et al. | 359/566 |
| 2004/0042079 A1 | * | 3/2004 | Ertel et al. | 359/566 |

FOREIGN PATENT DOCUMENTS

| | | | | |
|---|---|---|---|---|
| JP | 2000-304613 | | 11/2000 | |
| JP | 2000-321135 | * | 11/2000 | G01J/3/18 |

* cited by examiner

Primary Examiner—F. L. Evans
Assistant Examiner—Kara Geisel
(74) Attorney, Agent, or Firm—Westerman, Hattori, Daniels & Adrian, LLP (57) ABSTRACT

The present invention relates to a spectrometer whereby the accuracy of wavelength measurement can be improved without being affected by the environment of use. The present invention is characterized by improvements made to a spectrometer for spectrally dividing the light under measurement by transmitting the components thereof at different, wavelength-by-wavelength angles, and receiving and detecting the light under measurement thus spectrally divided by the chromatic dispersion device using an optical detector. The apparatus according to the present invention comprises a refractive index compensation means for compensating changes in the angle at which the chromatic dispersion device transmits the light under measurement, according to changes in the refractive index of the medium in which the chromatic dispersion device is placed.

9 Claims, 6 Drawing Sheets

SPECTROMETER AND OPTICAL SPECTRUM ANALYZER

BACKGROUND OF THE INVENTION

1. Field of the Invention

The present invention relates to a spectrometer and an optical spectrum analyzer using a chromatic dispersion device, and more specifically, to a spectrometer and an optical spectrum analyzer whereby the accuracy of wavelength measurement can be improved without being affected by the environment of use.

2. Description of the Prior Art

A spectrometer spectrally divides the light under measurement by transmitting the components thereof at different, wavelength-by-wavelength angles using a chromatic dispersion device, and detects the light thus spectrally divided by the chromatic dispersion device, using an optical detector. An optical spectrum analyzer uses an output from the optical detector of the spectrometer to measure the wavelengths of optical signals (for example, Japanese Laid-open Patent Application 2000-304613). For example, the analyzer is used for such light under measurement in which a plurality of optical signals are wavelength-division multiplexed (WDM), in order to measure the wavelengths of the individual optical signals.

Figure 1:
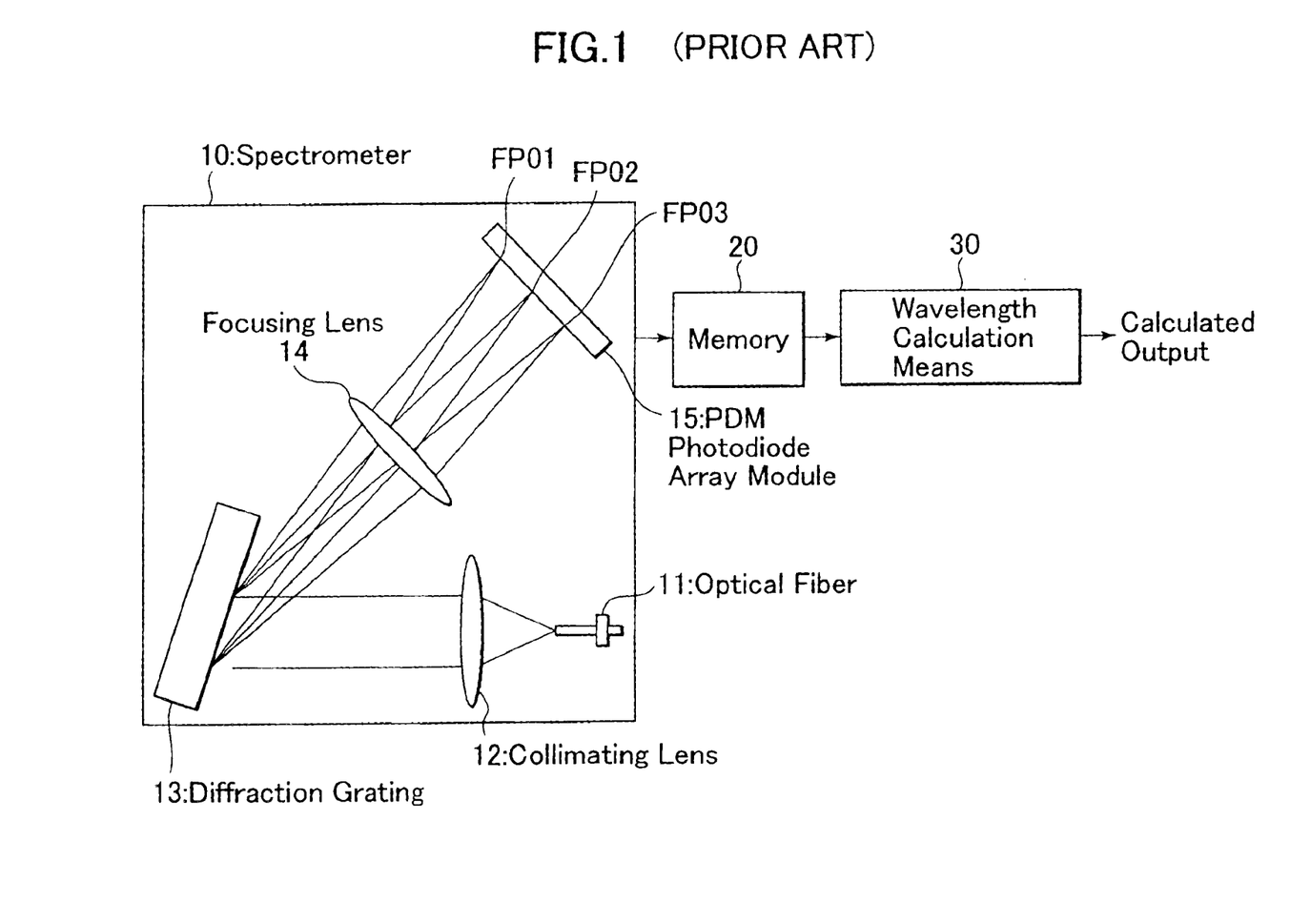
FIG. 1 is a schematic view illustrating an example of a conventional optical spectrum analyzer.

FIG. 1 is a schematic view illustrating an example of such a conventional optical spectrum analyzer as mentioned above.

In FIG. 1, spectrometer 10 is given an input of light under measurement, measures the spectrum of the light, and outputs measurement data as sampling data. Spectrometer 10 comprises optical fiber 11, collimating lens 12, diffraction grating 13, focusing lens 14, and photodiode array module 15.

Optical fiber 11 is a transmission line having an optical output window for emitting the light to be measured. Collimating lens 12 is positioned opposite to the optical output window of optical fiber 11, in order to collimate the light to be measured emitted from optical fiber 11 before transmitting the light.

Diffraction grating 13 is a chromatic dispersion device, which is tilted toward collimating lens 12 so that outgoing light from collimating lens 12 is diffracted at a desired angle. Diffraction grating 13 spectrally divides the light under measurement by reflecting the components thereof at different, wavelength-by-wavelength angles. Focusing lens 14, which is placed on the optical path of the outgoing light from diffraction grating 13, converges the outgoing light to form an image.

Photodiode array module 15 (hereinafter abbreviated as PDM 15) is an optical detector comprising a plurality of photodiodes that are light receiving elements, and is placed in a position where the light under measurement is converged to form an image.

PDM 15 samples the optical power of the light under measurement using the light receiving elements and outputs sampling data as the measurement data. Wavelengths are previously allocated to the individual light receiving elements of PDM 15.

Memory 20 is a storage unit and stores measurement data output from spectrometer 10. Wavelength calculation means 30 reads the measurement data from memory 20 and calculates the wavelengths of optical signals from the wavelengths allocated to the individual light receiving elements of PDM 15.

The behavior of the apparatus configured as described above is explained below.

The light under measurement emitted from optical fiber 11 is collimated by collimating lens 12. The light under measurement that has passed through collimating lens 12 enters diffraction grating 13. The light under measurement is then spectrally divided by diffraction grating 13. In other words, the angle of reflection from diffraction grating 13 differs depending on the wavelength of each ray of the light. The components of the light under measurement that has been spectrally divided by diffraction grating 13 are converged by focusing lens 14 at the individual light receiving elements of PDM 15 to form images.

For example, the components of light with different wavelengths are converged by focusing lens 14 on the light receiving elements positioned at points "FP01," "FP02" and "FP03" in FIG. 1 to form images.

Each light receiving element of PDM 15 outputs a current (photocurrent) corresponding to the optical power of each ray of the light under measurement. Using a converter which is not illustrated in the figure, PDM 15 converts photocurrents output from the individual light receiving elements to voltages. Since the signals obtained by current-to-voltage conversion are analog signals, the converter converts the analog signals to digital signals, and the digital signals are stored in memory 20 as measurement data.

As explained above, the measurement data composes sampling data that has been sampled by using the light receiving elements.

Wavelength calculation means 30 reads the measurement data from memory 20, determines the wavelengths of optical signals from the wavelengths allocated to the individual light receiving elements, and outputs these results of calculation to an output unit not illustrated in the figure. The output unit displays the calculation results on a display, for example, or outputs the results to an external device not illustrated in the figure.

Next, the relationship between the incidence and reflection angles of the light under measurement formed by diffraction grating 13 is explained below.

The relationship between the incidence and reflection angles of the light under measurement formed by diffraction grating 13 is represented by equation (1) below.

$$\sin \theta_{gi} + \sin \theta_{go} = \lambda/(n_a \cdot d) \qquad (1)$$

where $\theta_{gi}$ is the angle of incidence of the light under measurement toward diffraction grating 13, $\theta_{go}$ is the angle of reflection of the light under measurement from diffraction grating 13, $\lambda$ is the wavelength, $n_a$ is the refractive index of the medium (air under normal conditions) of an environment in which diffraction grating 13 is used, and d is the grating constant of diffraction grating 13.

From equation (1), the relationship between the wavelength and the reflection angle is represented by equation (2) below.

$$\Delta\lambda/\Delta\theta_{go} = n_a \cdot d \cdot \cos \theta_{go} \qquad (2)$$

As described above, even in the case of such light under measurement wherein a plurality of optical signal wavelengths are mixed, diffraction grating 13 reflects the components of the light at different, wavelength-by-wavelength angles, so that the components of the light under measurement are converged at the differently positioned light receiving elements of PDM 15 to form images. Consequently, it is possible to determine the wavelengths of individual optical signals.

It should be noted that in order to be able to obtain desired wavelengths, the refractive index of the medium (air) must be constant. However, if any of such factors of the environment of use as the altitude above sea level, atmospheric pressure, temperature, and steam pressure differs, the refractive index of air also changes. For this reason, the angle of reflection from diffraction grating 13 changes even if the wavelengths of the light under measurement remain the same.

From equation (1), a change in the angle of reflection for a change in the refractive index of a medium is represented by equation (3) below.

$$\Delta\theta_{go}/\Delta n_a = -\lambda/(n_a^2 \cdot d \cdot \cos\theta_{go}) \qquad (3)$$

For example, assume that $\lambda=1.55$ [μm], d=1.111 [μm], $n_a=1.000268$, and $\theta_{go}=1.248$ [rad] (71.5 [deg]). Then, from equation (3), $\Delta\theta_{go}/\Delta n_a \approx -4.42$ holds true.

Consequently, even if the refractive index $n_a$ of air changes by only as small as 0.00001 (equivalent to a change in altitude above sea level from 0 [m] to approximately 300 [m]) from 1.000268 to 1.000258, the angle of reflection changes by as much as 0.0442 [mrad]. This amount of change is equivalent to a wavelength of 15.5 [pm], according to equation (2).

This means that even if the wavelengths remain the same, the positions of images on PDM 15 also change as the refractive index of air changes.

As a result wavelength calculation means 30 calculates the wavelengths of the light under measurement from the positions of images on PDM 15, the accuracy of wavelength measurement deteriorates.

SUMMARY OF THE INVENTION

An object of the present invention is to provide a spectrometer and an optical spectrum analyzer whereby the accuracy of wavelength measurement is improved without being affected by the environment of use.

DETAILED DESCRIPTION OF THE PREFERRED EMBODIMENTS

Preferred embodiments of the present invention are described in detail below with reference to the accompanying drawings.

First Embodiment

Figure 2:
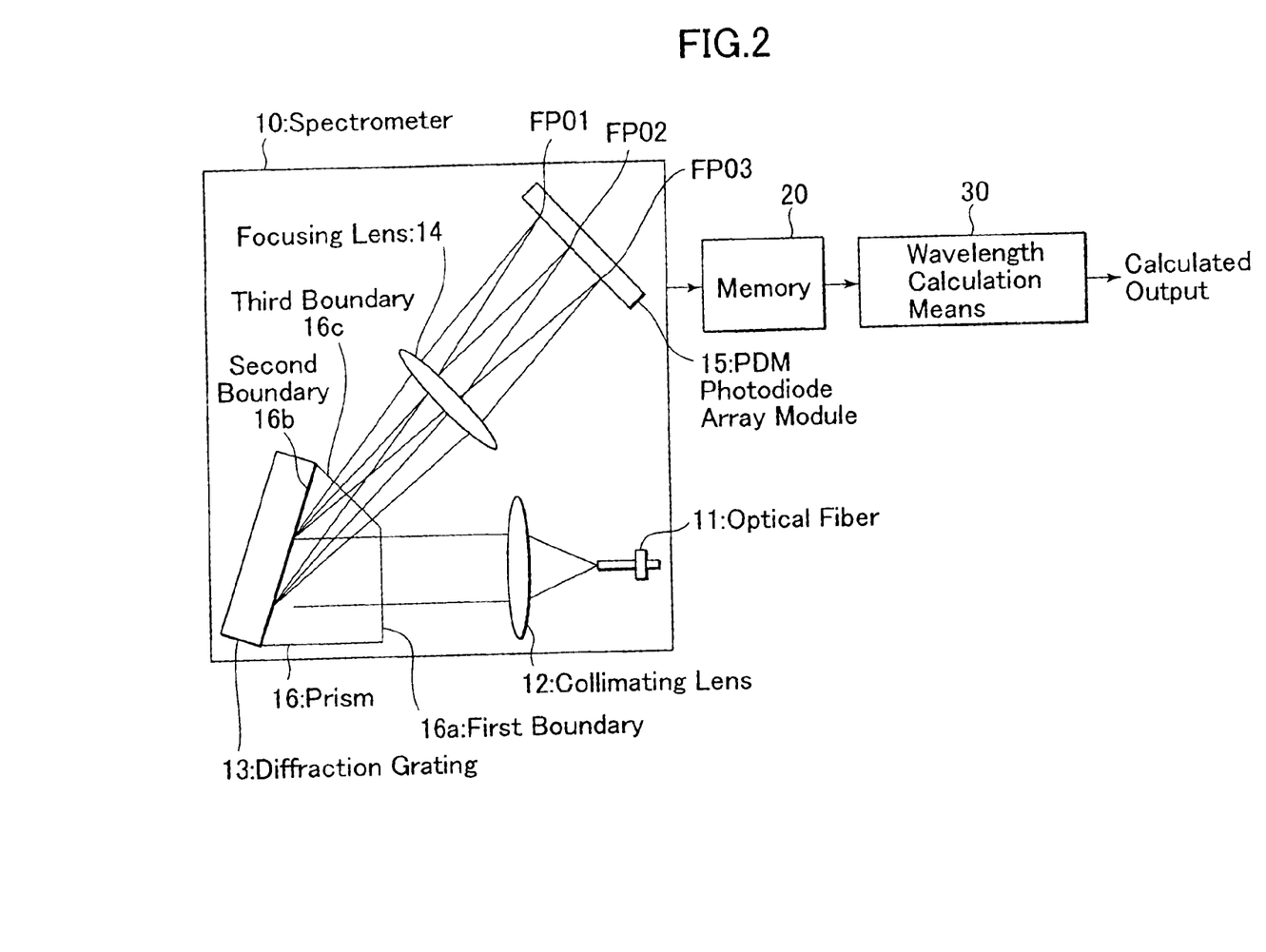
FIG. 2 is a schematic view illustrating a first embodiment in accordance with the present invention.

FIG. 2 is a schematic illustrating a first embodiment in accordance with the present invention. In this figure, elements identical with those of FIG. 1 are referenced alike and excluded from the description that follows. In FIG. 2, prism 16 which is a refractive index compensation means has been added to spectrometer 10. Prism 16 compensates for changes in the angle at which diffraction grating 13 reflects the light under measurement, by taking advantage of changes in the refractive index of the medium in which diffraction grating 13 is placed. This prism is in tight contact with and therefore integral with diffraction grating 13. Prism 16 is made of, for example, glass.

The light under measurement from collimating lens 12 is almost perpendicularly projected to first boundary 16a. Since second boundary 16b is tightly joined to the diffracting plane of diffraction grating 13, the light under measurement that has been spectrally divided by diffraction grating 13 exits from third boundary 16c almost perpendicularly. Second boundary 16b and diffraction grating 13 are fixed to each other using an adhesive agent, for example.

The behavior of such an apparatus as discussed above is described in detail below.

The light to be measured emitted from optical fiber 11 is changed to parallel light by collimating lens 12. The light under measurement that has passed through collimating lens 12 enters first boundary 16a of prism 16 almost perpendicularly. The light is then spectrally divided on a wavelength-by-wavelength basis by diffraction grating 13 tightly joined to second boundary 16b. In other words, the angle of reflection from diffraction grating 13 varies from one wavelength to another. The light under measurement that has been spectrally divided on a wavelength-by-wavelength basis by diffraction grating 13 almost perpendicularly exits from third boundary 16c of prism 16. The light is then converged by focusing lens 14 to the individual light receiving elements of PDM 15 to form images.

Figure 3:
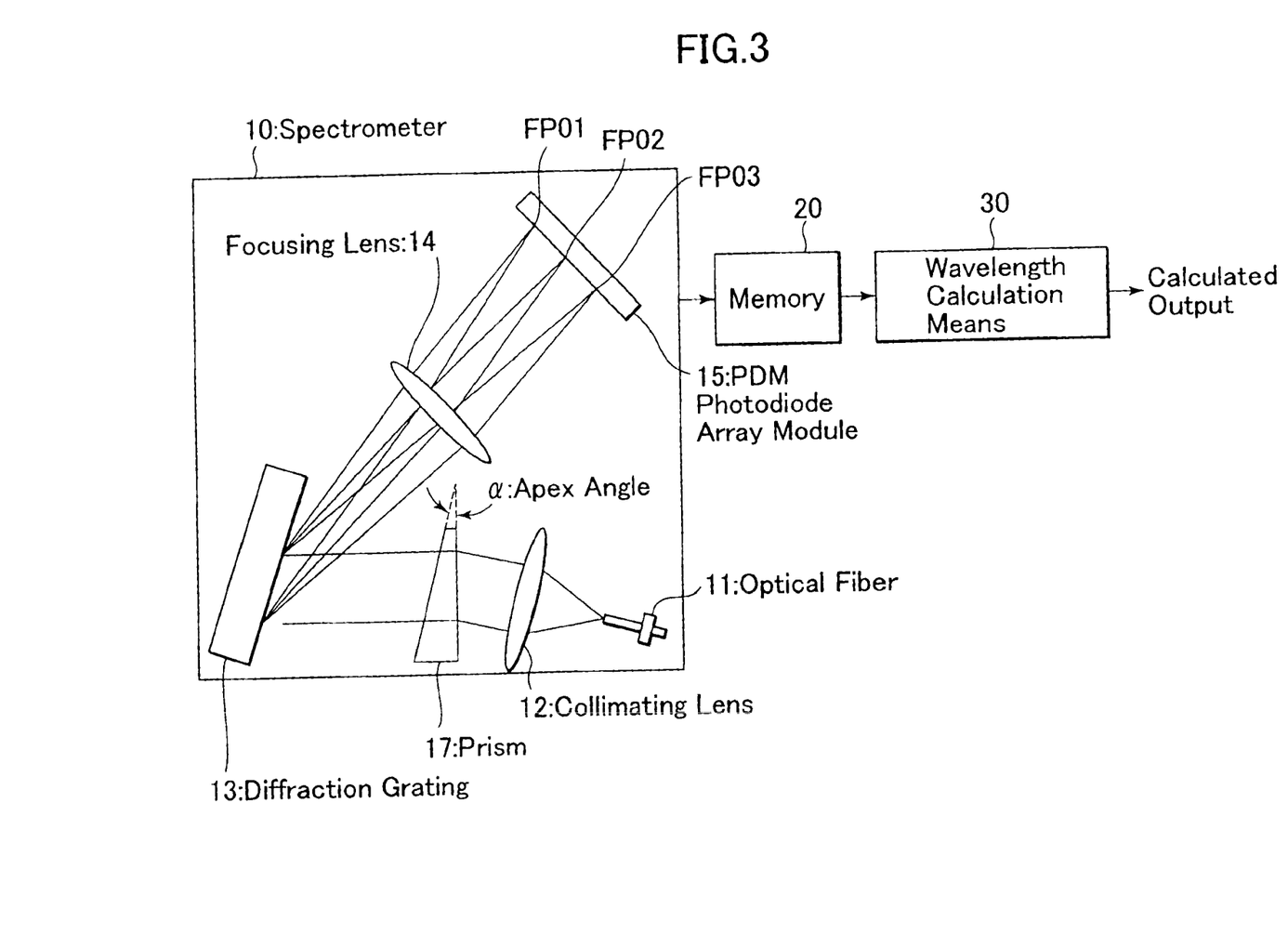
FIG. 3 is a schematic view illustrating a second embodiment in accordance with the present invention.

For example, components of the light with different wavelengths converge on the light receiving elements positioned at points "FP01", "FP02" and "FP03" in FIG. 3. The individual light receiving elements of PDM 15 output currents (photocurrents) corresponding to the optical power of the individual components of the light under measurement. PDM 15 converts photocurrents, which are output from individual light receiving elements, to voltages using a converter not illustrated in the figure. Since the signals obtained by current-to-voltage conversion are analog signals, the converter converts the analog signals to digitals signals, and the digital signals are stored in memory 20 as measurement data. Thus, the measurement data composes sampling data that has been sampled by using the light receiving elements.

Wavelength calculation means 30 reads the measurement data from memory 20, determines the wavelengths of optical signals from the wavelengths allocated to the individual light receiving elements, and outputs these results of calculation to an output unit not illustrated in the figure. The output unit displays the calculation results on a display, for example, or outputs the results to an external device not illustrated in the figure.

Now, the behaviors of diffraction grating 13 and prism 16 are explained in detail below.

Diffraction grating 13 and prism 16 are tightly joined to each other and arranged in place and the medium with which the diffracting plane of diffraction grating 13 is in contact is the glass material of prism 16. Therefore, the angle of reflection from the diffracting plane does not change even if the refractive index of air changes. In addition, since the light under measurement perpendicularly enters and passes through first boundary 16a of the prism, the optical path does not change even if the refractive index of air changes.

It should also be noted that when the light under measurement exits from third boundary 16c of the prism, the individual components of the light pass through the third boundary with marginal, wavelength-by-wavelength angles from third boundary 16c. However, the reflection angle is basically not affected by such diffraction index changes. More specifically, the relationship between the angle of incidence of the light under measurement reflected from diffraction grating 13 toward third boundary 16c of the prism and the angle of reflection therefrom is represented by equation (4) below.

$$n_g \cdot \sin \theta_{2i} = n_a \cdot \sin \theta_{2o} \quad (4)$$

where $\theta_{2i}$ is the incidence angle and $\theta_{2o}$ is the reflection angle, $n_g$ is the refractive index of the glass material used for the prism, and $n_a$ is the refractive index of air.

Furthermore, a change in the reflection angle for a change in the refractive index of air is represented by equation (5) below.

$$\Delta \theta_{2o} / \Delta n_a = -\tan \theta_{2o} / n_a \quad (5)$$

Assuming that $\theta_{2o} \approx 5$ [deg], then $\Delta \theta_{2o} / \Delta n_a \approx 0.1$. For wavelengths of light in particular, which perpendicularly passes through third boundary 16c of the prism, $\Delta \theta_{2o} / \Delta n_a = 0.0$ holds true. Accordingly, even if the refractive index of air changes, the positions in which the images of the light under measurement are formed on PDM 15 do not change basically.

As explained above, the light under measurement almost perpendicularly enters first boundary 16a of prism 16 which is tightly joined to diffraction grating 13, and the outgoing components of the light under measurement reflected from diffraction grating 13 almost perpendicularly exit from third boundary 16c of prism 16. Accordingly, even if the environment of use changes, causing the refractive index of the medium (air) to also change, images of the light under measurement are formed in almost the same positions of PDM 15. Consequently, it is possible to improve the accuracy of wavelength measurement without being affected by the environment of use.

Second Embodiment

FIG. 3 is a schematic view illustrating a second embodiment of the present invention. In this figure, elements identical with those of FIG. 2 are referenced alike and excluded from the description that follows. In FIG. 3, prism 17 is provided in place of prism 16 between collimating lens 12 and diffraction grating 13, in order to deflect the light under measurement transmitted from collimating lens 12 toward diffraction grating 13. The apex angle $\alpha$ of prism 17 is an angle formed by the plane which the light under measurement enters and the plane from which the light exits. The material of prism 17 is, for example, glass.

The behavior of such an apparatus as discussed above is described in detail below.

The light under measurement that has been changed to parallel light by collimating lens 12 is input to prism 17. Prism 17 deflects the light under measurement toward diffraction grating 13. Diffraction grating 13 reflects the light under measurement at different, wavelength-by-wavelength angles to spectrally divide the light.

If the refractive index of air changes, the angle at which prism 17 deflects the light under measurement also changes, causing the angle of incidence toward diffraction grating 13 from prism 17 to also change. However, the amount of change caused by prism 17 cancels the amount of change in the angle at which diffraction grating 13 reflects the light under measurement.

At this point, specific examples of the angle at which the light under measurement is deflected by prism 17 (hereinafter referred to as the deflection angle or the angle of deflection) are described below.

The relationship between the apex angle $\alpha$ of prism 17 and the deflection angle is represented by equation (6) below.

$$n_g \cdot \sin \alpha = n_a \cdot \sin(\alpha + \theta_p) \quad (6)$$

where $\theta_p$ is the deflection angle.

From equation (6), the relationship between changes in the refractive index of air and changes in the deflection angle $\theta_p$ is represented by equation (7) below.

$$\begin{aligned}\frac{d\theta_p}{dn_a} &= -\frac{n_g \sin \alpha}{n_a \cos(\alpha + \theta_p)} \\ &= -\frac{n_g \sin \alpha}{n_a \sqrt{1 - \sin^2(\alpha + \theta_p)}} \\ &= -\frac{n_g \sin \alpha}{n_a \sqrt{1 - \left(\frac{n_g}{n_a} \sin \alpha\right)^2}} \\ &= -\frac{1}{\sqrt{\left(\frac{n_a}{n_g \sin \alpha}\right)^2 - 1}}\end{aligned} \quad (7)$$

On the other hand, the relationship between changes in the incidence angle of the light under measurement and changes in the reflection angle thereof at diffraction grating 13 is represented by equation (8) below.

$$\Delta \theta_{go} / \Delta \theta_{gi} = -\cos \theta_{gi} / \cos \theta_{go} \quad (8)$$

Consequently, from equations (3), (7) and (8) where the signs are determined so that $\Delta \theta_p = \Delta \theta_{gi}$ holds true, the condition to be satisfied proves to be equation (9) below.

$$\begin{aligned}\frac{d\theta_p}{dn_a} \frac{d\theta_{go}}{d\theta_{gi}} + \frac{d\theta_{go}}{dn_a} &= 0 \\ \Rightarrow \frac{1}{\sqrt{\left(\frac{n_a}{n_g \sin \alpha}\right)^2 - 1}} \frac{\cos \theta_{gi}}{\cos \theta_{go}} - \frac{\lambda}{n_a^2 d \cos \theta_{go}} &= 0\end{aligned} \quad (9)$$

From equation (9), it is understood that if the apex angle $\alpha$ is set to such a value as mentioned below under the below-listed conditions, the positions at which the images of the light under measurement are formed on optical detector 15 do not change even if the refractive index of air changes.

Refractive index $n_a$ of air=1.000268
Refractive index $n_g$ of prism 17=1.5
Angle of incidence $\theta_{gi}$ of light under measurement toward diffraction grating 13=0.463 [rad] (26.5 [deg])
Angle of reflection $\theta_{go}$ of light under measurement from diffraction grating 13=1.250 [rad] (71.6 [deg])
Wavelength $\lambda = 1.55$ [μm]
Grating constant d of diffraction grating 13=1.111 [μm]
Apex angle a of prism 17=0.595 [rad] (34.1 [deg])

All other behaviors of the apparatus of the second embodiment are identical with those of the apparatus illustrated in FIG. 2, except that prism 17 deflects the light under measurement transmitted from collimating lens 12 toward diffraction grating 13 to spectrally divide the light. Such behaviors are therefore not explained here.

As described above, prism 17 with apex angle $\alpha$ cancels the amount of change in the angle of reflection from diffraction grating 13 caused by a change in the refractive index of air by deflecting the light under measurement transmitted from collimating lens 12. Accordingly, the light under measurement forms images in basically the same positions on optical detector 15 even if the environment of use changes, causing the refractive index of the medium (air) to also change.

Consequently, it is possible to improve the accuracy of wavelength measurement without being affected by the environment of use.

Third Embodiment

Figure 4:
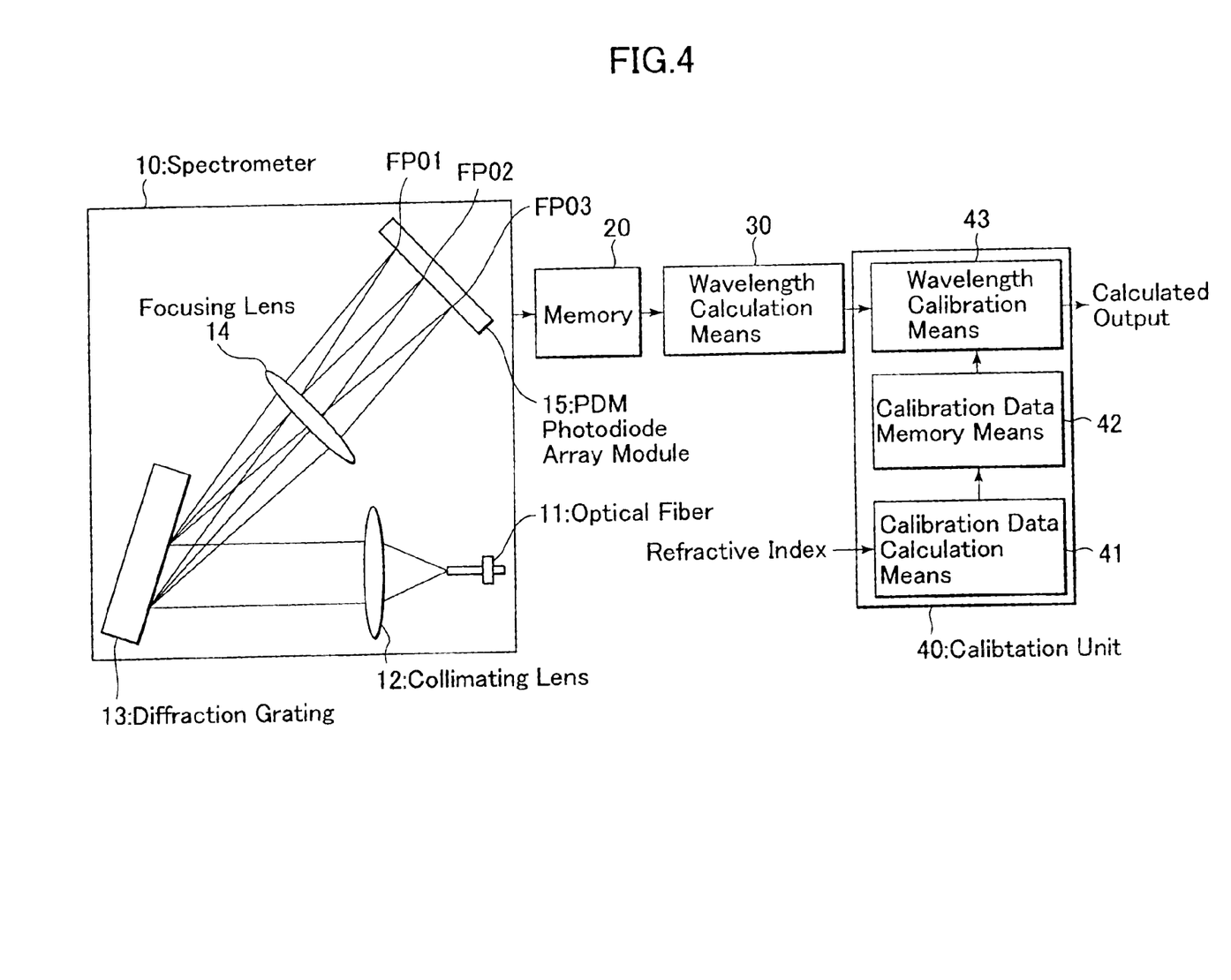
FIG. 4 is a schematic view illustrating a third embodiment in accordance with the present invention.

FIG. 4 is a schematic view illustrating a third embodiment in accordance with the present invention. In this figure, elements identical with those of FIG. 1 are referenced alike and excluded from the description that follows. In FIG. 4, calibration unit 40 has been added to the optical spectrum analyzer illustrated in FIG. 1. This calibration unit 40 corrects the wavelengths determined by wavelength calculation means 30, according to the refractive index of air in which diffraction grating 13 is placed. Calibration unit 40 comprises calibration data calculation means 41, calibration data memory means 42 and wavelength calibration means 43.

Calibration data calculation means 41 determines the correction values with which to correct wavelength shifts, from the refractive index of air in which diffraction grating 13 is placed. Calibration data memory means 42 stores the correction values determined by calibration data calculation means 41. Wavelength calibration means 43 reads the corrections value from calibration data memory means 42 to correct the wavelengths determined by wavelength calculation means 30.

The behavior of such an apparatus as discussed above is described in detail below.

From such input means as a keyboard or operating buttons not illustrated in the figure, maintenance personnel inputs the refractive index of air, in which diffraction grating 13 is placed, to calibration data calculation means 41.

Next, from equations (2) and (3), calibration data calculation means 41 determines correction values for the wavelengths at the refractive index which was input through the input means; more specifically, calibration data calculation means 41 determines correction values with which to correct wavelength shifts caused by changes in the positions of images formed on PDM 15, according to changes in the angle of reflection of the light under measurement from diffraction grating 13 caused by changes in the refractive index of air. Then, calibration data calculation means 41 stores these correction values in calibration data memory means 2. Wavelength calibration means 43 reads the correction values from calibration data memory means 2, in order to correct the wavelengths determined by wavelength calculation means 30, using these correction values. Calibration unit 40 outputs the results of calculation to an output unit not illustrated in the figure. The output unit indicates the calculation results on the screen of a display unit, or outputs the results to an external device not illustrated in the figure.

All other behaviors of the apparatus of the third embodiment are identical with those of the apparatus illustrated in FIG. 1, except that from the refractive index of air in which diffraction grating 13 is placed, calibration unit 40 determines correction values with which to correct wavelength shifts and corrects the wavelengths determined by wavelength calculation means 30 using these correction values. Such behaviors are therefore not explained here.

As described above, calibration data calculation means 41 determines correction values for wavelengths at the refractive index of air in which diffraction grating 13 is placed. According to these correction values, wavelength calibration means 43 corrects the wavelengths determined by wavelength calculation means 30. Accordingly, even if the positions of images formed by the light under measurement on PDM 15 are shifted as the refractive index of air changes, causing errors to occur in the results of calculation made by wavelength calculation means 30, it is possible to reduce such errors. Consequently, it is possible to improve the accuracy of wavelength measurement without being affected by the environment of use.

Fourth Embodiment

Figure 5:
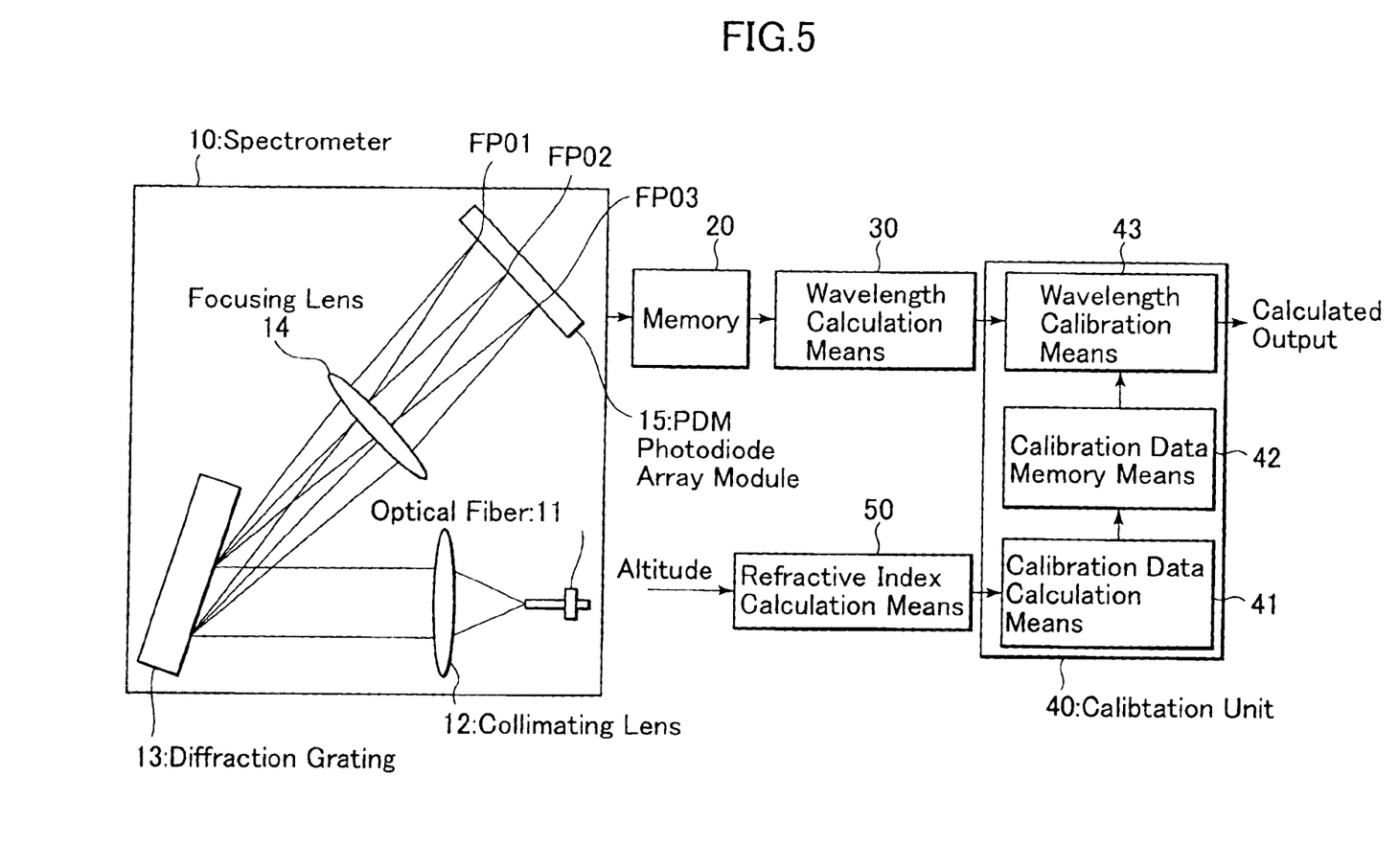
FIG. 5 is a schematic view illustrating a fourth embodiment in accordance with the present invention.

FIG. 5 is a schematic view illustrating a fourth embodiment in accordance with the present invention. In this figure, elements identical with those of FIG. 4 are referenced alike and are excluded from the description that follows.

In FIG. 5, refractive index calculation means 50 has been added to the apparatus of FIG. 4. This refractive index calculation means 50 determines the refractive index of air at an altitude above sea level at which diffraction grating 13 is placed. Refractive index calculation means 50 outputs the refractive index thus determined to the calibration data calculation means 41 of calibration unit 40.

The behavior of such an apparatus as discussed above is described in detail below.

From such input means as a keyboard or operating buttons not illustrated in the figure, maintenance personnel inputs the altitude above sea level, at which spectrometer 10 comprising diffraction grating 13 is placed, to refractive index calculation means 50. Refractive index calculation means 50 determines the refractive index of air at the altitude thus input, and outputs the refractive index thus determined to the calibration data calculation means 41 of calibration unit 40.

As is the case with the apparatus illustrated in FIG. 4, calibration data calculation means 41 determines correction values for wavelengths at the refractive index determined by refractive index calculation means 50 from equations (2) and (3), and stores these correction values in calibration data memory means 42.

All other behaviors of the apparatus of the fourth embodiment are identical with those of the apparatus illustrated in FIG. 4, except that refractive index calculation means 50 determines the refractive index of air at the altitude at which diffraction grating 13 is placed, and outputs the refractive index to the calibration data calculation means 41 of calibration unit 40. Such behaviors are therefore not described here.

As described above, refractive index calculation means 50 determines the refractive index of air at the altitude at which spectrometer 10 comprising diffraction grating 13 is placed. For example, in order to measure the wavelengths of signals for wavelength division multiplexing (WDM) used in optical communication, spectrometer 10 is often installed within a station, such as a transmitting station, relaying station or receiving station. Since such a station as mentioned above is usually air-conditioned and/or temperature-controlled, the refractive index of air is governed by the altitude. Consequently, it is possible to easily determine wavelength correction values since the refractive index can be determined exclusively from the altitude above sea level.

Fifth Embodiment

Figure 6:
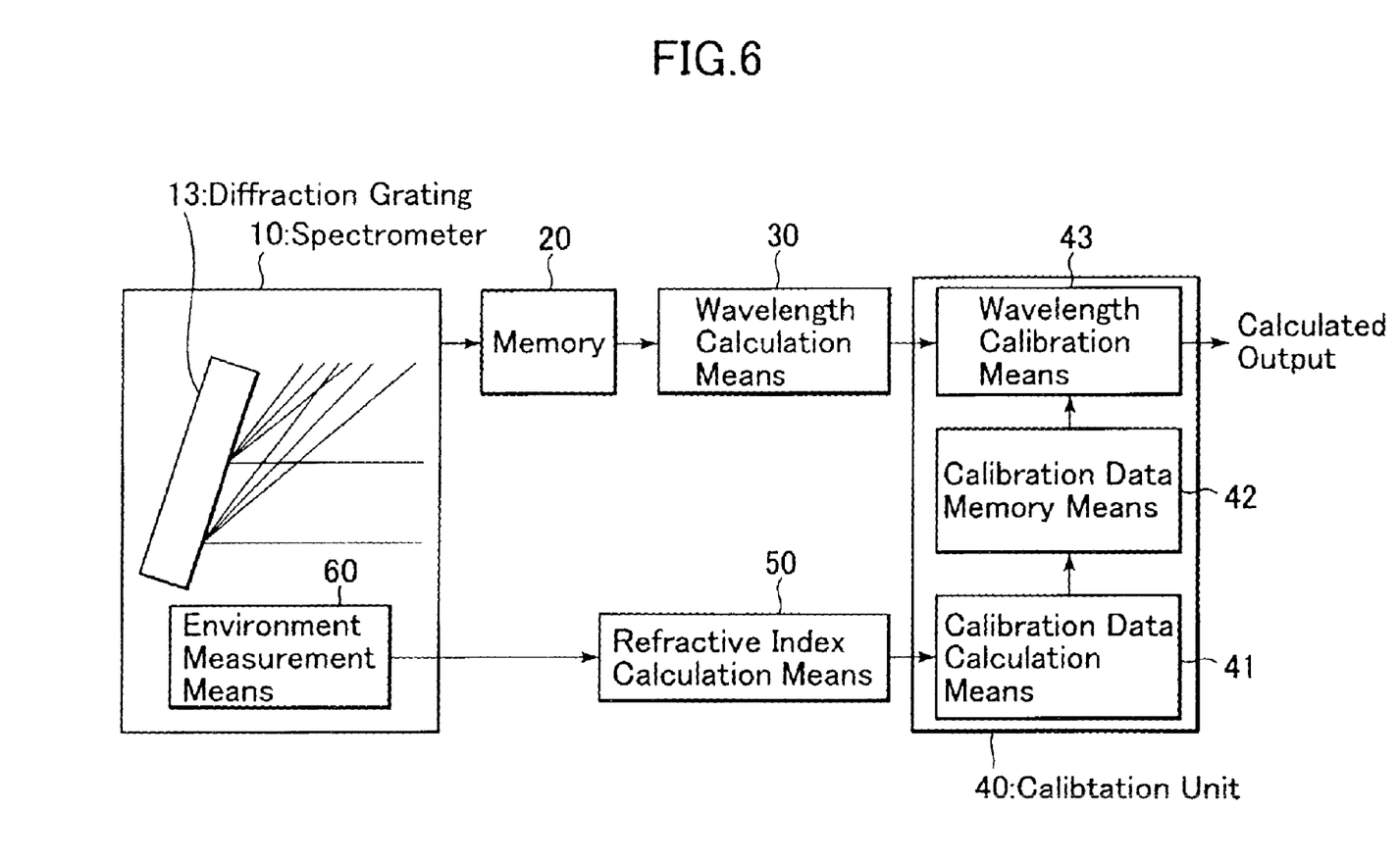
FIG. 6 is a schematic view illustrating a fifth embodiment in accordance with the present invention.

FIG. 6 is a schematic view illustrating a fifth embodiment in accordance with the present invention. In this figure, elements identical with those of FIG. 5 are referenced alike and excluded from the description that follows, and are not illustrated.

In FIG. 6, environment measurement means 60 has been added near the diffraction grating 13 of spectrometer 10.

This environment measurement means 60 measures altitude and outputs the altitude thus measured to refractive index calculation means 50. Environment measurement means 60 is, for example, an altimeter or a global positioning system (GPS).

The behavior of such an apparatus as discussed above is described in detail below.

Environment measurement means 60 measures altitude in the vicinity of diffraction grating 13, and outputs the altitude thus measured to refractive index calculation means 50. Then, as is the case with the apparatus illustrated in FIG. 5, refractive index calculation means 50 determines the refractive index from the altitude.

All other behaviors are identical with those of the apparatus illustrated in FIG. 5, except that environment measurement means 60 measures altitude in the vicinity of diffraction grating 13 and outputs the altitude thus measured to refractive index calculation means 50. Such behaviors are therefore not described here.

As described above, environment measurement means 60 measures altitude in the vicinity of diffraction grating 13 and outputs the altitude to refractive index calculation means 50, thus eliminating the need for any maintenance personnel. In addition, it is possible to determine the altitude as necessary and obtain correction values from the altitude to correct wavelength shifts. Consequently, it is possible to reduce costs involved and obtain correction values anew when necessary.

It should be noted that the present invention is not limited to the embodiments heretofore described but may be embodied in other ways, as described below.

Although the apparatus illustrated in FIG. 2 or 3 is configured so that sampling data from spectrometer 10 is stored in memory 20 and wavelength calculation means 30 determines the wavelengths of the light under measurement from this memory 20, the apparatus may alternatively be configured so as to contain spectrometer 10 only, without including memory 20 and wavelength calculation means 30, so that an output from PDM 15 is transferred to an external device.

Although the apparatus illustrated in FIG. 3 is configured so that prism 17 is provided between collimating lens 12 and diffraction grating 13, prism 17 may alternatively be provided in a specific position on the optical path before the point where the light under measurement is received by PDM 15.

For example, prism 17 may be provided between optical fiber 11 and collimating lens 12, between diffraction grating 13 and focusing lens 14, or between focusing lens 14 and PDM 15.

Although the apparatus illustrated in FIG. 4 is configured so that calibration data calculation means 41 determines correction values from the refractive index that has been input, and stores the correction values in calibration data memory means 42, calibration data calculation means 41 need not be provided if the environment of use, such as the altitude at which spectrometer 10 placed, is previously known. Alternatively, it is possible to previously determine waveform-correcting values based on the refractive index of air and store the values in calibration data memory means 42, so that wavelength calibration means 43 reads the correction values from this calibration data memory means 42 to correct the wavelengths determined by wavelength calculation means 30.

Although the apparatus illustrated in FIG. 5 or 6 is configured so that refractive index calculation means 50 determines the refractive index from an altitude indicating an elevation relative to the given sea level, the refractive index may alternatively be determined from an altitude indicating an elevation relative to the ground level of a desired location. As a matter of course, environment measurement means 60 outputs an altitude above ground level, rather than an altitude above sea level, in this case.

Although the apparatus illustrated in FIG. 5 or 6 is configured so that refractive index calculation means 50 determines the refractive index from an altitude indicating an elevation relative to the given sea level, the refractive index may alternatively be determined from other environmental factors as substitutes such as an air composition (mixture ratios of $N_2$, $O_2$, Ar, $CO_2$, etc), an altitude above ground, atmospheric pressure, temperature, relative humidity, and steam pressure to cope with power failure, local defects of the device, etc. The device may use at least one of these environmental factors, environment measurement means 60 may change according to the environmental factors applied, for example, a thermometer for applying temperature.

Although only spectrometer 10 based on a polychromator method is mentioned with reference to the apparatus illustrated in FIG. 4, FIG. 5 or 6, all other types of spectrometer that are configured so as to spectrally divide the light under measurement and sample the spectrum obtained by such spectral division will be included within the scope of the present invention.

Although the apparatus illustrated in FIG. 4, 5 or 6 is configured so that diffraction grating 13 is used as the chromatic dispersion device that spectrally divides the light under measurement, a prism or the like may alternatively be used in place of diffraction grating 13 to spectrally divide the light under measurement.

Although spectrometer 10 mentioned with regard to the apparatus illustrated in FIG. 2, 3, 4, 5 or 6 is a transmission-type optical system using lenses 12 and 14, spectrometer 10 may alternatively be a reflection-type optical system using parabolic mirrors or the like.

According to the present invention, the following advantageous effects are provided.

In one aspect of the present invention, since a refractive index compensation means compensates for changes in the angle at which a chromatic dispersion device reflects the light under measurement, by means of changes in the refractive index of the medium, the light under measurement forms images in basically the same positions on an optical detector even if the environment of use changes, causing the refractive index of the medium to also change. Consequently, it is possible to improve the accuracy of wavelength measurement without being affected by the environment of use.

In another aspect of the present invention, since the light under measurement almost perpendicularly enters the refractive index compensation means tightly joined to the diffracting plane of the chromatic dispersion device and diffracted light from the chromatic dispersion device is almost perpendicularly transmitted from the refractive index compensation means, the light under measurement forms images in basically the same positions on the optical detector even if the environment of use changes, causing the refractive index of the medium to also change. Consequently, it is possible to improve the accuracy of wavelength measurement without being affected by the environment of use.

In yet another aspect of the present invention, since the refractive index compensation means deflects the light under measurement to cancel changes in the angle of reflection from the chromatic dispersion device caused by changes in the refractive index of the medium, the light under measurement forms images in basically the same positions on the optical detector even if the environment of use changes, causing the refractive index of the medium to also change. Consequently, it is possible to improve the accuracy of wavelength measurement without being affected by the environment of use.

In yet another aspect of the present invention, a calibration unit corrects wavelengths determined by a wavelength calculation means according to the refractive index of the medium in which the chromatic dispersion device is placed. Accordingly, even if the positions of images formed by the light under measurement on the optical detector are shifted as the refractive index of the medium changes, causing errors to occur in the results of calculation made by the wavelength calculation means, it is possible to reduce such errors. Consequently, it is possible to improve the accuracy of wavelength measurement without being affected by the environment of use.

In yet another aspect of the present invention, no manual input of the refractive index to said calibration unit is neccesary, since the refractive index calculation means for determining the refractive index in which said the chromatic dispersion device is placed from the environment of use, automatically outputs said refractive index thus determined to said calibration unit.

In yet another aspect of the present invention, an environment measurement means measures an environment of use in the vicinity of the chromatic dispersion device and outputs the the environment of use to the refractive index calculation means, thus eliminating the need for any maintenance personnel. In addition, it is possible to determine the environment of use as necessary and obtain correction values from the environment of use to correct wavelength shifts. Consequently, it is possible to reduce costs involved and obtain correction values anew when necessary.

What is claimed is:

1. An optical spectrum analyzer wherein the light under measurement is spectrally divided by transmitting the components thereof at different, wavelength-by-wavelength angles using a chromatic dispersion device, said light under measurement thus spectrally divided by said chromatic dispersion device is received by an optical detector, and a wavelength calculation means determines the wavelengths of said light under measurement by means of an output from said optical detector, wherein said optical spectrum analyzer comprises a calibration unit for correcting wavelengths determined by said wavelength calculation means according to the refractive index of the medium in which said chromatic dispersion device is placed.

2. The optical spectrum analyzer of claim 1, wherein said calibration unit comprises:
   calibration data memory means for storing correcting values for wavelengths at a desired refractive index; and
   wavelength calibration means for reading said correction values from said calibration data memory means to correct wavelengths determined by said wavelength calculation means.

3. The optical spectrum analyzer of claim 1, wherein said calibration unit comprises:
   calibration data memory means for storing correcting values for wavelengths;
   calibration data calculation means for determining correction values from the refractive index of the medium in which said chromatic dispersion device is placed and storing said correction values in said calibration data memory means; and
   wavelength calibration means for reading said correction values from said calibration data memory means to correct wavelengths determined by said wavelength calculation means.

4. The optical spectrum analyzer of claim 3, further comprising refractive index calculation means for determining the refractive index of the medium in which said chromatic dispersion device is placed from the environment of use, and outputting said refractive index thus determined to said calibration unit.

5. The optical spectrum analyzer of claim 4, further comprising environment measurement means for measuring the environment of use, and outputting the results of measurement to said refractive index calculation means.

6. The optical spectrum analyzer of claim 4, wherein said the environment of use includes at least one factor of an air composition, an altitude above ground, sea level, atmospheric pressure, temperature, relative humidity, or steam pressure.

7. The optical spectrum analyzer of claim 5, wherein said environment measurement means is an altimeter.

8. The optical spectrum analyzer of claim 5, wherein said environment measurement means is a GPS.

9. The optical spectrum analyzer of claim 1, 2, 3, 4, 5, 6, 7 or 8, wherein said chromatic dispersion device is a diffraction grating or a prism.

* * * * *